June 26, 1962 R. WOODCOCK 3,041,612

HEADS FOR MAGNETIC STORAGE DRUMS

Filed June 23, 1959

INVENTOR
RAYMOND WOODCOCK

Miles S. Pillars

ATTORNEY 3,041,612

HEADS FOR MAGNETIC STORAGE DRUMS

Raymond Woodcock, Sale, England, assignor to Metropolitan-Vickers Electrical Company Limited, London, England, a British company Filed June 23, 1959, Ser. No. 822,335
Claims priority, application Great Britain June 27, 1958
5 Claims. (Cl. 346—74)

This invention relates to heads for magnetic storage drums. Such heads contain a large number of elements which write information into and read information out of the drum and are required to be positioned close to the drum. These drums and their associated heads have wide application as information storage units in electronic digital computers.

The gap between the head and the magnetic coating of the drum is in most cases less than one thousandth of an inch and is usually set by some form of micrometer adjustment. Differences of temperature between the drum and the head mounting members will cause the magnitude of the gap to vary and whilst in small diameter drums this effect may not be detrimental, in large diameter drums it can be so great as to cause complete closure of the gap.

The object of the present invention is to provide a magnetic head in which the magnitude of the gap between head and drum is constant irrespective of minor variations in the diameter of the drum.

According to the present invention a head for use with a magnetic information storage drum contains a recess in the face of the head, together with means for supplying compressed air or gas to said recess and means for urging the head towards a drum, the arrangement being such that in operation the face of the head will be held off the face of the drum by means of the pressure built up inside the recess counteracting the force of said urging means.

In a preferred embodiment the means for urging the head towards a drum comprises a pneumatic system fed from the same compressed air or gas supply source. With such an arrangement it will be appreciated that pressure variations in the air or gas supply will not affect the size of the gap. To control the magnitude of the gap a throttle can be included in the supply pipe to the recess.

Spring means may be provided acting oppositely to said urging means so that in the event of failure of said compressed air or gas supply the head is moved clear of the drum, i.e. the head fails to safety.

The recess is preferably bounded on either side by plates extending axially of the drum and adjustable in a radial direction to allow for the convexity of the drum.

In order that the invention may be more fully understood reference will now be made to the drawing accompanying this specification, in which.

Figure 1:
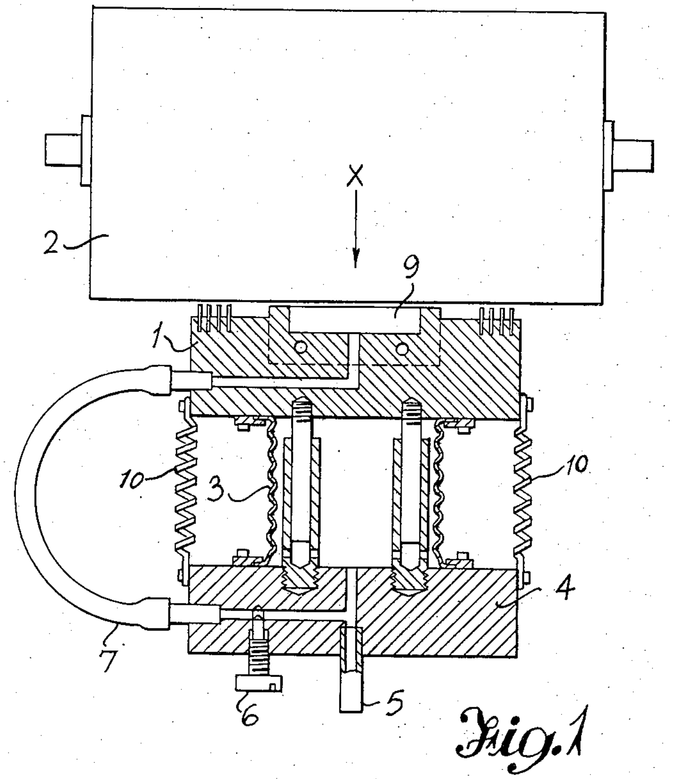
FIG. 1 shows a view in section of a head embodying the invention.
Figure 2:
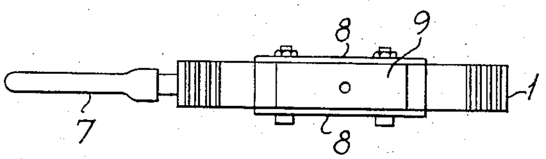
FIG. 2 is a view of the head of FIG. 1 looking in the direction X.

Referring now to FIGS. 1 and 2 of the drawing there is shown a head 1 into which are fixed a plurality of magnetic elements arranged to co-operate with the magnetic coating provided on a drum 2 so as to write information into or read information out of the drum. It is necessary to space these elements very close to but not touching the surface of the drum. To achieve this head 1 is fixed to the end of a bellows 3 anchored to a fixed mounting member 4. A compressed air supply provided through inlet pipe 5 is fed to bellows 3 so as to cause head 1 to move towards drum 2. This air supply is also fed through a flexible pipe 7 to a recess 9 provided in the face of head 1. The recess 9 is bounded on either side by cheeks 8. When the head approaches close to the drum pressure is built up inside recess 9 which tends to hold the head away from the drum. The gap between the head and drum is determined by the relative pressures in the bellows and the pressure chamber. Due to the face that variations in the air supply will affect both the bellows and the recess very small gaps can be accurately maintained over wide variations of pressure and changes in the diameter of the drum due to expansion have virtually no effect on the size of the gap. The gap can however be altered at will by means of the adjusting screw 6 which acts to throttle the air supply to the recess without altering the pressure in the bellows. If a very light spring 10 is provided to urge head 1 towards mounting member 4 it will be seen that any failure of the air supply will cause the block to move away from the drum. Cheeks 8 can be adjusted radially of the drum to allow for a convexity of different sizes of drums and prevent excessive air leakage.

While the means for urging the head towards the drum has been illustrated as a bellows, clearly other pneumatic means can equally well be used, such as a cylinder fixed to mounting member 4 and a piston working in this cylinder and fixed to head 1.

What I claim is:

1. A head for use with a magnetic information storage drum comprising a fixed mounting member, a head member, a plurality of read-write elements carried by said head member, bellows means connected to said mounting member and to said head member on the side thereof remote from the drum surface for permitting movement of said head member towards and away from said drum surface, means defining a recess in said head member on the side thereof remote from said bellows means, a pipe for connection to a compressed gas supply, parallel connections from said pipe to the space defined by said bellows means and from said pipe to said recess and throttle means connected in one of said parallel connections for controlling relative gas pressures within said bellows means and said recess.

2. A head for use with a magnetic information storage drum comprising a mounting member, a head member, a plurality of read-write elements carried by said head member, bellows means mounting said head member on said mounting member for permitting movement of said head member towards and away from the drum surface, means defining a recess in said head member on the side thereof remote from said bellows means, a pipe for connection to a compressed gas supply, two parallel connections to said pipe, one of said parallel connections being made to the space enclosed by said bellows means, the other of said parallel connections being made to said recess, and throttle means connected in said other parallel connection for controlling the relative gas pressures within said bellows means and said recess.

3. A head for use with a magnetic information storage drum comprising a mounting member, a head member, a plurality of read-write elements carried by said head member, bellows means mounting said head member on said mounting member for permitting movement of said head member towards and away from the drum surface, means preventing rotational movement of the head member relative to the mounting member, means defining a recess in said member on the side thereof remote from said bellows means, a pipe for connection to a compressed gas supply, parallel connections from said pipe to the space defined by said bellows means and from said pipe to said recess in said head member, and throttle means connected in one of said parallel connections for controlling the relative gas pressures within said bellows means and said recess.

4. A head for use with a magnetic information storage drum comprising a mounting member, a head member, a plurality of read-write elements carried by said head member, bellows means mounting said head member on said mounting member for permitting movement of said head member towards and away from the drum surface, the side plates provided on said head member and lying parallel to the axis of said magnetic information storage drum with which said head is to be used and defining in part a recess in said head member on the side thereof remote from said bellows means, adjusting means for said side plates which allow movement of said plates in directions towards and away from the axis of said drum to enable a constant gap to be maintained between the head member and drums of different diameters, a pipe for connection to a compressed gas supply, two parallel connections to said pipe, one of said parallel connections being made to the space enclosed by said bellows means and the other of said parallel connections being made to said recess in the head member, and throttle means connected in said other parallel connection for controlling relative gas pressures within said bellows means and said recess.

5. A head for use with a magnetic information storage drum comprising a mounting member, a head member, a plurality of read-write elements carried by said head member, bellows means mounting said head member on said mounting member for permitting movement of said head member towards and away from said drum surface, means preventing rotational movement of said head member relative to said mounting member, side plates on said head member and lying parallel to the axis of said drum with which said head is to be used and defining in part a recess in said head member on the side thereof remote from said bellows means, means for moving said side plates in directions towards and away from the axis of said drum to enable said head to be used with drums of different diameters, a pipe for connection to a compressed gas supply source, two parallel connections to said pipe, one of which is made to the space enclosed by said bellows means, while the other is made to said recess in said head member, and throttle means provided in said other parallel connection for controlling the relative gas pressures within the bellows means and said recess in said head member.

References Cited in the file of this patent

UNITED STATES PATENTS

| | | |
|---|---|---|
| 2,560,430 | Friend | July 10, 1951 |
| 2,905,768 | Cronquist | Sept. 22, 1959 |
| 2,937,240 | Harker | May 17, 1960 |

FOREIGN PATENTS

| | | |
|---|---|---|
| 1,172,048 | France | Oct. 13, 1958 |
| 804,441 | Great Britain | Nov. 19, 1958 |
| 1,020,803 | Germany | Dec. 12, 1957 |